May 14, 1940. J. DANIELS 2,200,416
MEANS FOR THE CLOSING OR SHUTTING OFF OF PIPES, CHANNELS, OR THE LIKE
Filed Jan. 11, 1938
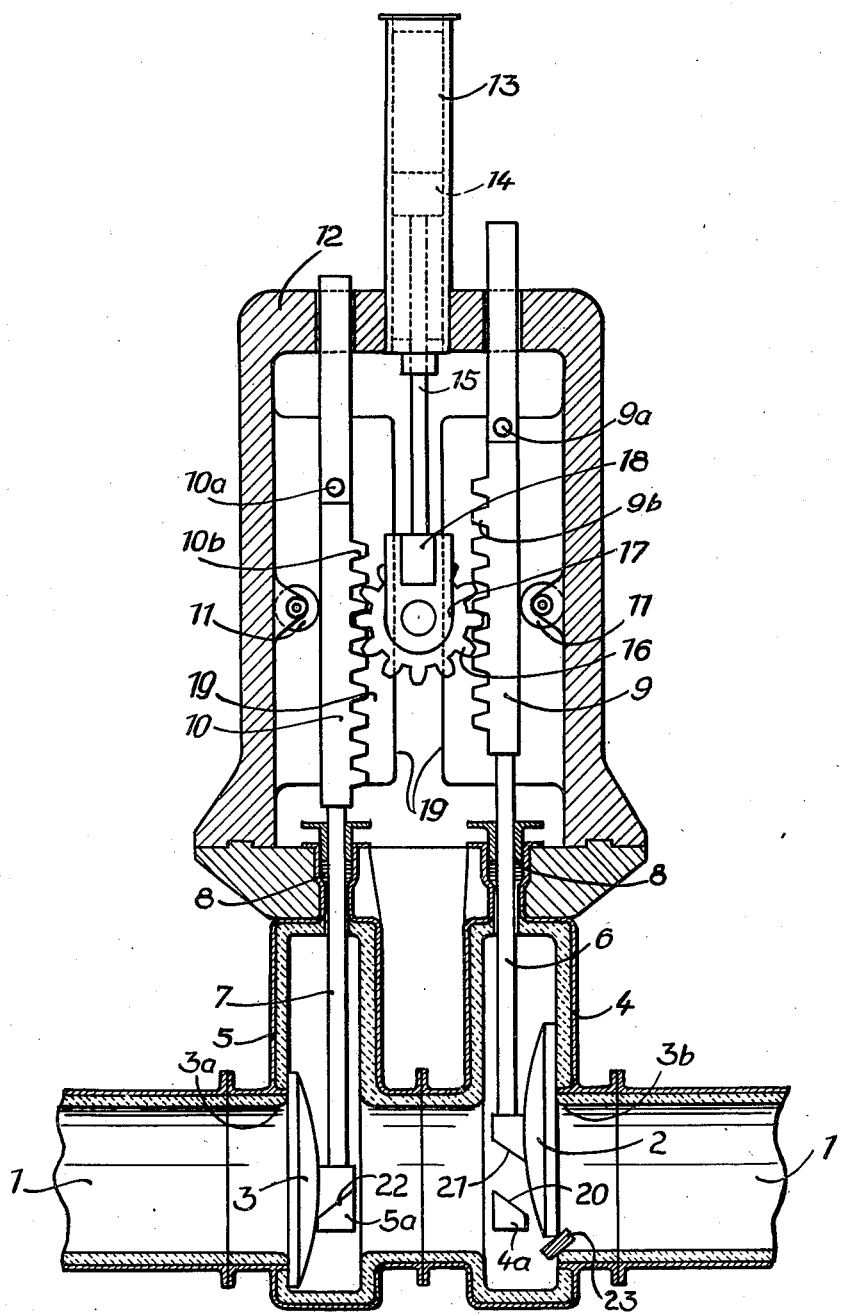
Inventor:
Joseph Daniels
By Henry Love Clarke
his atty.

UNITED STATES PATENT OFFICE 2,200,416

MEANS FOR THE CLOSING OR SHUTTING OFF OF PIPES, CHANNELS, OR THE LIKE

Joseph Daniels, Essen, Germany, assignor, by mesne assignments, to Koppers Company, Pittsburgh, Pa., a corporation of Delaware Application January 11, 1938, Serial No. 184,371
In Germany January 14, 1937

2 Claims. (Cl. 277—33)

The present invention relates to means for the closing or shutting off of pipes, channels or the like or any other openings traversed by gases or liquids and more particularly to that type of such closure means in which two sealing plates or discs are arranged to be operated by a common controlling device, said plates or discs being movable in a radial direction towards and away from the axis of the pipe or the like in order to shut off and to open said pipe, channel or opening respectively.

In intermittently operated water gas plants, there are provided for instance various pipes or channels which are traversed in one operating period by air and in another period by combustible gases, such as water gas. In order to prevent the combustible gases from being mixed with air, and to avoid an explosive mixture of air and gas from being formed, the pipes or channels for conducting the said media of water gas plants have to be carefully sealed before the next operating period of the cycle is started.

A special feature of my present invention is the provision of an improved closure means suitable for such water gas plants or the like, although my present invention is not limited in all its aspects to use in said water gas installations.

It has already been suggested to equip water gas plants with shut-off means in which the seal is effected by means of two plate-shaped bodies or discs, which can be moved radially of the axis of the pipe to be closed and which can be manipulated by a common controlling device. The pressure of the gases varies rather considerably within the pipe lines of intermittently operated water gas plants and rather frequently. Shut-off means consisting of two plate-shaped sealing bodies or discs are very suitable for closing the pipe lines or the like in which prevail comparatively high gas pressure conditions.

I have, however, found that the design of shut-off means which hitherto has been used and recommended for water gas plants, is not able to fulfill certain special requirements of the water gas operation.

When operating water gas installations, it often occurs that solid constituents are carried forward with the gas passing from the gas producer at a comparatively high velocity, for instance lumps of coke or slag. Such solid substances deposit easily in the casings of valves and precipitations will finally cause a condition in which the plate-shaped closing members cannot be moved exactly into the closed position in which they are required to do to fit against the rim of the opening to be closed in a gas tight manner.

Furthermore, it has been suggested to design the shut-off means fitted with two plate-shaped sealing bodies or discs in such a manner that one of the two sealing bodies is rigidly connected with the actuating member, whereas the other one is connected therewith elastically, for instance by the means of a spring. This kind of connection is intended to render it possible, that if one sealing member cannot be moved accurately into the closed position required for the pipe line or the like to be shut off completely, the other member, nevertheless, comes safely into its proper closing position. According to my opinion, this suggestion is impracticable. If, for instance, the connecting spring is flexible enough to move the second sealing member into the closing position by pressing together the connecting spring, in the case of the closing member connected rigidly to the controlling device should have stuck, there is the danger that the weak spring does not fully press the shut-off member into the closing position. On the other hand, a very strong spring which under all circumstances will press the closing member into position, even if stickings of minor importance have to be overcome, requires too robust moving means, such as hydraulic arrangements, in order that the strong connecting springs will be sufficiently pressed together, if necessary. Such hydraulic controlling or moving devices also are disadvantageous with regard to cost and operation.

My present invention has for its object to provide such improvements in shut-off means, for pipes, channels or other openings, and consisting of two or several plate-shaped closing members, that a safe and perfectly gas-tight seal is attained without making use of operating means of unusual dimensions.

Principally, my invention consists in providing either of the plate-shaped sealing members each with an operating rod movable and guided independently from the other one, and connecting these operating rods with the controlling or actuating device, by means of a movable element arranged on the controlling or operating device and adapted to transmit the movement of the controlling or operating device to the said operating rods for the closure bodies or discs, and this in such a manner that the plate-shaped closing members may move relatively to each other during the closing or opening operation.

Furthermore, my invention consists in connecting the closing bodies or discs with the actuating device by means of a toothed wheel, or pinion, arranged rotatably on the movable part of the actuating or controlling device, and meshing with a rack which is provided on each closing body, or disc, or the operating rod thereof, in such a manner that either one of the plate-shaped closing members can be moved relatively to the other by rotation of the toothed wheel, or pinion.

Further objects and features of my present invention may be taken from the following description of a preferred form of practicing my invention on the lines of the accompanying drawing which shows a vertical section through a shut-off means according to the present invention.

On the drawing, the pipe line to be closed is shown at 1. The valve discs 2 and 3 serve to shut off the line, said discs being movable in the casings 4 and 5. The discs 2 and 3 are fastened to rods 6 and 7, respectively, extending through the valve casing in stuffing boxes 8.

In closing position, the valve plates 2, 3 fit against the valve seats for openings 3a, 3b of the casings 4, 5. In the casings 4, 5 are arranged bridges 4a, 5a having an inclined face 20. This inclined face is situated relatively to the inclined faces 21, 22 arranged at the rear of the valves 3, 4 in such a manner that at the end of the downward movement of the valve discs 2 and 3, the inclined faces 21, 22 press against the bridges 4a, 5a and consequently, the discs 2 and 3 are pushed against the seat for the casing holes 3a, 3b.

The valve rods 6 and 7 each carry a rod 9, 10 at their outer projecting end. The rollers 11 guide the valve rods 9 and 10. At the upper end, the valve rods 9 and 10 are guided in suitable bores of the framing 12.

The valve rods 9, 10 are fitted with stops 9a, 10a which press against and are arrested by a cross bar of the frame 12 when the valve rods move upwards.

An actuating cylinder 13 which is, for instance, operated by compressed-air, is fixed to the cross bar of the framing. The working piston 14 of the operating cylinder 13 is connected with a rod 15. Instead of such pneumatic actuating means, a spindle or other suitable means known to those skilled in the art, may be used for actuating the rod-like member 15. The rod 15 is connected with a toothed wheel 16. The toothed wheel or pinion 16 engages two racks 9b, 10b arranged on the upper part of the disc rods 9, 10. The toothed wheel 16 is rotatably arranged in a forked bearing 17 therefor, which bearing is provided at both sides with guide-shoulders 18, guiding the bearing fork for the toothed wheel 16 in a guide 19 on the frame 12.

The method of operating the device is essentially as follows:

Assuming that both valve discs have been drawn upwards for the open position of the valves and that the closing means is to be operated to shut-off the conduit. Compressed-air is admitted into the space above the piston 14 and thereby the piston 14 is moved downwards, longitudinally of the direction of movement of the valves 2 and 3 into or out of seating relationship with the seats therefor in the conduit. With this downward movement, there is no rotation of the toothed wheel 16, which although rotatably connected with the piston rod 15, first merely takes with it the rods 9 and 10, moving them together in the same direction nearly uniformly, since the resistance for the movement of the two valves is essentially the same and hence pinion 16 cannot rotate. Now, assuming that the movement of the valve disc 2 is arrested near the end of the stroke by means of a solid substance 23 which has been carried forward into the valve casing. When the movement of the valve disc 2 is arrested, the valve disc 3 is caused to continue to move downward until it reaches its correct closing position, by the rotation of the toothed wheel in an anti-clockwise direction, the arrested rack acting as a fixed rack or fulcrum for a lever, or a pinion to rotate or walk therealong.

The upward movement is effected in a similar way. When lifting the piston, both valves will be completely opened regardless whether the discs are lifted simultaneously or one after the other. However, a suitable shut-off device can be provided for the upward movement so that both valves may be lifted nearly at the same time.

It is advisable to equip the device with suitable indicating elements which inform the operator of the exact position of both the valve rods. The simplest method of such indication consists in marking the upper end which projects from the framing of each operating rod.

Instead of using the differential gear as described in the foregoing, it is also possible to obtain the relative movement of the two rods by the adoption of adequate levers. Furthermore, it may be preferable to insert springs or other elastical power transmission means between the actuating member and the valve discs or other closure means.

I have now described the present invention on the lines of a preferred embodiment thereof, but my invention is not limited in all its aspects to the mode of carrying out as described and shown since the invention may be variously embodied within the scope of the following claims.

I claim:

1. Closure means for pressure-fluid conduits traversed by liquids or gases, comprising at least two shut-off valves mounted for movement in the same direction transversely of the conduit, said valves being each provided with an operating rack each of which is mounted for movement independently of the other; a common actuating member provided with a pinion in engagement with each of the operating racks to operate the same; said common actuating member being mounted for moving the pinion longitudinally of the direction of movement of the valves to move their racks and the valves in unison in the same direction to and from the valve seats, and the pinion being mounted for rotation on the operating member so that when the common actuating member is actuated longitudinally, the pinion will move both racks in unison in the same direction, but upon premature arrestment of one valve the pinion then may rotate relative the arrested rack, upon further longitudinal movement of the actuating member, and thereby continue the longitudinal movement of the other rack and its valve into and out of seating relation notwithstanding the premature arrestment of one of the valves and its rack.

2. Closure means for pressure-fluid conduits traversed by liquids or gases, comprising at least two shut-off valves mounted for movement in the same direction transversely of the conduit, said valves being each provided with an operating rack each of which is mounted for movement independently of the other; a common actuating member provided with a movable element in engagement with each of the operating racks to operate the same; said common actuating member being mounted for moving the movable element longitudinally of the direction of movement of the valves to move their racks and the valves in unison in the same direction to and from the valve seats, and the movable element being mounted for movement on the operating member and being freely connected with the teeth of the racks to be free to move therealong so that when the common actuating member is actuated longitudinally, the movable element will move both racks in unison in the same direction, but upon premature arrestment of one valve the movable element then may move relative the arrested rack and, upon further longitudinal movement of the actuating member, the movable element may then move along the teeth of the arrested rack and thereby continue the longitudinal movement of the other rack and its valve into and out of seating relation notwithstanding the premature arrestment of one of the valves and its rack.

JOSEPH DANIELS.